Aug. 7, 1962 G. M. GREENSPAN 3,047,966
WINDOW DISPLAY APPARATUS
Filed June 30, 1961
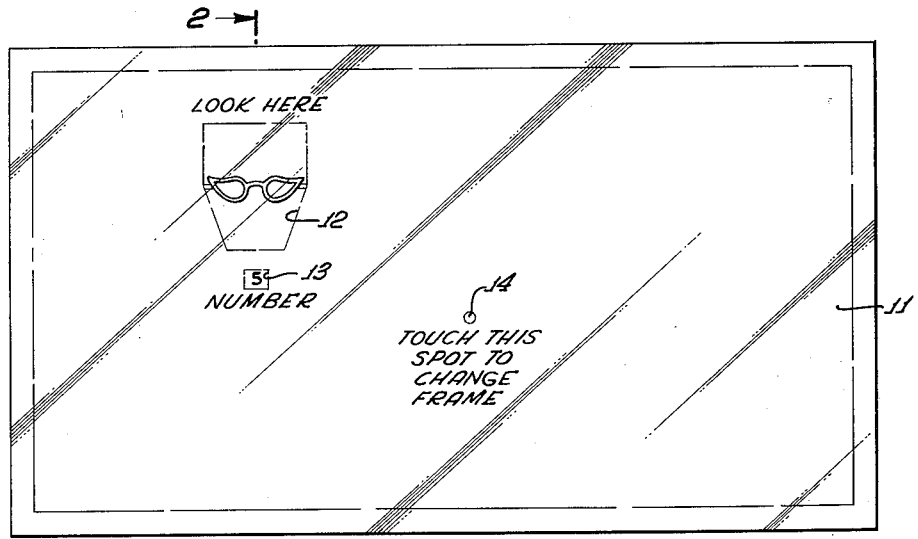
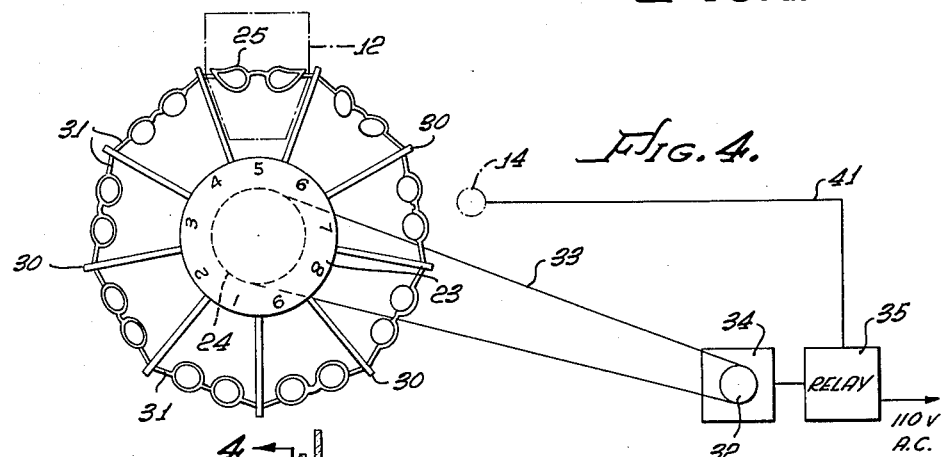
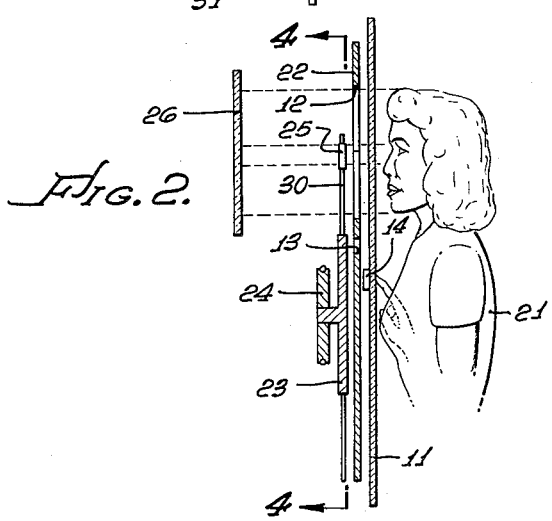
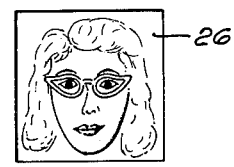
INVENTOR.
GEORGE M. GREENSPAN
BY
ATTORNEY.

United States Patent Office 3,047,966
Patented Aug. 7, 1962

3,047,966
WINDOW DISPLAY APPARATUS
George M. Greenspan, % Jack Dover, 1970 E. 18th St., Brooklyn, N.Y.
Filed June 30, 1961, Ser. No. 120,996
10 Claims. (Cl. 35—53)

The present invention relates to window displays, and more particularly to apparatus for displaying spectacle frames in a window.

The conventional way to display eyeglass or spectacle frames in the display window of an optometrist's office or store front is to arrange the spectacle frames in rows upon wires or other supports. The potential patient or customer, while passing by on the street, is expected to stop, look in the window, and mentally select the frames that esthetically appeal most to him or her. He is expected then to enter the office and try on the selected frames, one after the other, while looking in a mirror until one pair of frames is chosen as the most flattering. It is obviously difficult, if not impossible, for the potential patient or customer to select the frames most flattering to his or her shaped face, while merely looking at the rows of frames through the window.

It is an object of the present invention, therefore, to provide a novel apparatus for displaying spectacle frames through a window.

It is another object of the present invention to provide apparatus for displaying spectacle frames through a window in such a manner that the patient or customer can see how he or she looks in any one pair of spectacle frames selected from a number of pairs, before entering the optometrist's office or store.

Acording to one embodiment of the present invention, apparatus for displaying sunglass or spectacle frames through a window comprises a hub or disc having a plurality of pairs of spectacle frames annularly suspended away from and about the disc. A motor actuated by a capacity-operated switch rotates the disc. A person can rotate the frame-bearing disc from outside a store window by touching the window near the capacity-operated switch. An opaque screen prevents the person from seeing any portion of the apparatus other than one pair of spectacle frames at a time. A mirror is positioned behind that pair of frames, so that the person can look through the window and see his or her face in the mirror, with that pair of frames appearing as though being worn.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a view of a store window containing a spectacle-frame display in accordance with the present invention, as seen by a person standing outside the store.

FIGURE 2 is a sectional view taken along line 2—2 of FIGURE 1.

FIGURE 3 shows what is seen by the person looking in the window shown in FIGURES 1 and 2.

FIGURE 4 is a view taken along line 4—4 of FIGURE 2.

Referring now to the drawings, FIGURE 1 shows store window 11, as seen from outside the store. A person looking into window 11 will see face opening 12, identification opening 13, and capacity-operated switch 14. The words "Look here," "Number," and "Touch this spot to change frame," or any similar words, are painted close to face opening 12, identification opening 13, and capacity-operated switch 14, respectively.

FIGURE 2 shows person 21 looking through window 11 and touching the outside of window 11 with her finger where switch 14 is attached to the inside surface of window 11. Opaque cardboard screen 22 is shown containing face opening 12 and identification opening 13. Aluminum disc 23, which is connected to aluminum pulley wheel 24, and all of the spectacle frames fastened to disc 23, except frame 25, are obscured from the view of person 21 by screen 22. Mirror 26 is located behind frame 25, on a level with the head of person 21.

FIGURE 3 shows what person 21 sees when looking through face opening 12 into mirror 26. It will appear to person 21 as if she is wearing frame 25.

FIGURE 4 shows how disc 23 supports the spectacle frames. The temple bows of each frame have been removed and the frames are suspended annularly about disc 23 by aluminum support rods 30. The frames can be attached to rods 30 by spring hooks or clamps 31, which are inserted through the hinges of the temple-bowless frames. Rods 30 can be bolted to disc 23. Disc 23 has an identification number painted thereon for each frame. Each identification number cooperates with identification opening 13 so as to be visible therethrough.

Pulley wheel 24 is coupled to pulley wheel 32 by pulley belt 33. Pulley wheel 32 is driven by motor 34, which is turned on and off by relay 35. Relay 35 is controlled by capacity-operated switch 14, and is connected thereto by antenna wire 41. Motor 34 receives its power from a line voltage of 110 volts A.C. through relay 35. The operation of the system will now be described.

Person 21 places her face close to store window 11 and looks through opening 12. She sees her reflection in mirror 26 with frame 25 superimposed upon her image, as if worn by her. She then touches her finger to window 11 at the location of capacity-operated switch 14, which functions as an antenna. The approach of a human hand, even without coming in direct contact with switch 14, and even though there is a glass insulator between the hand and the antenna, changes the capacitance in a radio circuit, thereby operating relay 35. Relay 35 closes the circuit leading to motor 34 and turns the motor on. Pulley belt 33 will then very slowly rotate disc 23, causing a different spectacle frame to appear in opening 12. Person 21 can then remove her finger from window 11, stopping motor 34. She will be able to see herself in mirror 26 with a different spectacle frame superimposed upon her image.

If preferred, motor 34 can be set up so as to be automatically stopped by a cam, which would operate a cut-off switch. Then, when the motion of disc 23 is stopped, which would be predetermined so that a frame will be aligned with opening 12, it would actuate another cam, which would close the motor circuit and set-up relay 35 for the next frame.

There is no direct electrical connection to window 11, and, hence, there is no danger of electrical shock to person 21. Person 21 can repeat this procedure until she decides which frame she prefers, and after noting the identification number of that frame through opening 13, enter the office or store and state her preference.

While particular embodiments of the present invention have been shown and described, it will be obvious to those skilled in the art that changes and modifications may be made without departing from this invention in its broader aspects, and, therefore, the aim of the appended claims is to cover all such changes and modifications that fall within the true spirit and scope of this invention.

I claim:
1. Window display apparatus, comprising: a store window; a disc-shaped hub; a plurality of spectacle frames supported annularly about said hub by support means, each of said frames having its temple bows removed, and said support means comprising a plurality of rods projecting radially from said hub, there being one rod per frame and one end of each rod being clamped to one end of each of two frames; opaque means positioned in front of said frames and in close proximity to said store window so that all of said frames except one can be hidden from the view of a person looking at said apparatus through said store window, said opaque means having face and identification openings; a mirror positioned in alignment with said face opening behind said frames; motor means for rotating said central support member so that each of said frames can be sequentially positioned in alignment with said face opening in front of said mirror; and a capacity-operated switch for turning said motor means on and off, said switch being mounted to the inside of said store window and being operable by said person from the outside of said store window, said face opening being located at eye-level so that said person can look through said face opening and see one of said frames in said mirror, said identification opening displaying to said person information identifying the particular frame in alignment with said face opening.

2. Window display apparatus, comprising: a store window; a central support member; a plurality of spectacle frames supported annularly about said member by support means; opaque means positioned in front of said frames and in close proximity to said store window so that all of said frames except one can be hidden from the view of a person looking at said apparatus through said store window, said opaque means having face and identification openings; a mirror positioned in alignment with said face opening behind said frames; motor means for rotating said central support member so that each of said frames can be sequentially positioned in alignment with said face opening in front of said mirror; and a capacity-operated switch for turning said motor means on and off, said switch being mounted to the inside of said store window and being operable by said person from the outside of said store window, said face opening beign located at eye-level so that said person can look through said face opening and see one of said frames in said mirror, said identification opening displaying to said person information identifying the particular frame in alignment with said face opening.

3. Apparatus as defined in claim 2 in which said central support member is a disc-shaped hub.

4. Window display apparatus, comprising: a store window; a central support member; a plurality of spectacle frames supported annularly about said member by support means; opaque means positioned in front of said frames and in close proximity to said store window so that all of said frames except one can be hidden from the view of a person looking at said apparatus through said store window, said ouaque means having an opening; a mirror positioned in alignment with said opening behind said frames; motor means for rotating said central support member so that each of said frames can be sequentially positioned in alignment with said opening in front of said mirror; and a capacity-operated switch for turning said motor means on and off, said switch being mounted to the inside of said store window and being operable by said person from the outside of said store window, said opening being located at eye-level so that said person can look through said opening and see one of said frames in said mirror.

5. Window display apparatus comprising: a central support member; a plurality of items to be displayed supported annularly about said member by support means; opaque means having an opening positioned in front of said items so that all of them except one can be hidden from the view of a person looking at said apparatus through a store window; a mirror positioned in alignment with said opening behind said items; motor means for rotating said central support member so that each of said items can be sequentially positioned in alignment with said opening in front of said mirror; and a capacity-operated switch for turning said motor means on and off, said switch being operable by said person from the outside of said store window.

6. Apparatus as defined in claim 5 in which said central support member is a disc-shaped hub.

7. Apparatus as defined in claim 6 in which said support means comprises a plurality of rods projecting radially from said hub.

8. Window display apparatus comprising: a central support member; a plurality of items to be displayed supported annularly about said member by support means; opaque means having an opening positioned in front of said items so that all of them except one can be hidden from the view of a person looking at said apparatus through a store window; a mirror positioned in alignment with said opening behind said items; motor means for rotating said central support member so that each of said items can be sequentially positioned in alignment with said opening in front of said mirror; and a switch for turning said motor means on and off, said switch being operable by said person from the outside of said store window.

9. Store window display apparatus comprising: a central support member; a plurality of items to be displayed supported annularly about said member by support means; a mirror positioned in alignment with the path taken by said items when said support member is rotated; motor means for rotating said central support member so that each of said items can be sequentially positioned in front of said mirror; and switch means for turning said motor means on and off, said switch means being operable by a person from the outside of said store window.

10. Store window display apparatus comprising: support means for supporting a plurality of spectacle frames; a mirror positioned in alignment with the path taken by said spectacles when said support means is moved; motor means for moving said support means so that each of said spectacles can be sequentially positioned in front of said mirror; and switch means for turning said motor means on and off, said switch means being operable by a person from the outside of said store window.

References Cited in the file of this patent

UNITED STATES PATENTS

| 2,085,180 | Bevis | June 29, 1937 |
| 2,168,352 | Lawry | Aug. 8, 1939 |

FOREIGN PATENTS

| 800,933 | Germany | Dec. 14, 1950 |